United States Patent
Chen

(10) Patent No.: US 11,923,777 B2
(45) Date of Patent: Mar. 5, 2024

(54) POWER CONVERTER

(71) Applicant: Yosun Industrial Corp., Taipei (TW)

(72) Inventor: Ming-Hung Chen, Taipei (TW)

(73) Assignee: Yosun Industrial Corp., Taipei (TW)

( * ) Notice: Subject to any disclaimer, the term of this patent is extended or adjusted under 35 U.S.C. 154(b) by 193 days.

(21) Appl. No.: 17/577,396

(22) Filed: Jan. 18, 2022

(65) Prior Publication Data

US 2022/0345044 A1 Oct. 27, 2022

Related U.S. Application Data

(60) Provisional application No. 63/177,397, filed on Apr. 21, 2021.

(30) Foreign Application Priority Data

Aug. 26, 2021 (TW) .................................. 110131722

(51) Int. Cl.
*H02M 3/335* (2006.01)
*H02M 1/08* (2006.01)

(52) U.S. Cl.
CPC ......... *H02M 3/33569* (2013.01); *H02M 1/08* (2013.01)

(58) Field of Classification Search
CPC ............... H02M 3/33569; H02M 3/01; H02M 3/33573; H02M 1/0009
See application file for complete search history.

(56) References Cited

U.S. PATENT DOCUMENTS

| | | | |
|---|---|---|---|
| 8,040,696 B2 * | 10/2011 | Wu ..................... | H02M 3/3378 363/21.02 |
| 8,400,787 B2 | 3/2013 | Wu et al. | |
| 10,326,377 B1 * | 6/2019 | Xiong ..................... | H05B 45/14 |
| 10,658,937 B1 * | 5/2020 | Zafarana ............ | H02M 3/33592 |
| 11,277,070 B1 * | 3/2022 | Shafer ................ | H02M 3/33573 |
| 2015/0109824 A1 * | 4/2015 | Chen .................. | H02M 3/33576 363/17 |
| 2018/0054134 A1 * | 2/2018 | Moon ..................... | H02M 1/08 |
| 2023/0078085 A1 * | 3/2023 | Xu .......................... | H02M 1/36 363/21.02 |
| 2023/0088584 A1 * | 3/2023 | Panov ..................... | H02M 1/15 323/271 |
| 2023/0113700 A1 * | 4/2023 | Jacques ............. | H02M 3/33571 363/13 |

FOREIGN PATENT DOCUMENTS

| | | |
|---|---|---|
| TW | 200919925 | 5/2009 |
| TW | 201622323 | 6/2016 |
| TW | 202037054 | 10/2020 |

OTHER PUBLICATIONS

"Office Action of Taiwan Counterpart Application", dated Sep. 7, 2022, p. 1-p. 3.

* cited by examiner

*Primary Examiner* — Kyle J Moody

(74) *Attorney, Agent, or Firm* — JCIPRNET

(57) ABSTRACT

A power converter is provided. The power converter includes an LLC converter, a feedback circuit, a first driving circuit, and a second driving circuit. The LLC converter includes a first arm transistor group and a second arm transistor group. The feedback circuit provides a feedback signal corresponding to a current value of the LLC converter. The first driving circuit drives the first arm transistor group in response to the feedback signal and provides a control signal. The second driving circuit drives the second arm transistor group in response to the control signal.

10 Claims, 3 Drawing Sheets

POWER CONVERTER

CROSS-REFERENCE TO RELATED APPLICATION

This application claims the priority benefits of U.S. provisional application Ser. No. 63/177,397, filed on Apr. 21, 2021, and Taiwan application Ser. No. 110131722, filed on Aug. 26, 2021. The entirety of each of the above-mentioned patent applications is hereby incorporated by reference herein and made a part of this specification.

BACKGROUND

Technical Field

The disclosure relates to a power conversion field, and more particularly to a power converter.

Description of Related Art

An existing half-bridge LLC converter can use a single driver for operation, but the half-bridge LLC converter is not adapted for large power applications. Therefore, for large power applications, it is necessary to add another arm transistor group to the existing half-bridge LLC converter to realize a full-bridge LLC converter. In the architecture of the half-bridge LLC converter added with another arm transistor group, the driver mentioned above cannot drive the newly-added arm transistor group. Therefore, in existing practice, the drive is removed, and a micro-controller unit (MCU) is added.

However, this approach requires modification of the micro-controller unit, such as firmware writing based on two arm transistor groups. Therefore, removing the original driver, adding the micro-controller unit, and rewriting the firmware significantly increase the cost of modifying the half-bridge LLC converter to the full-bridge LLC converter.

SUMMARY

The disclosure provides a power converter that may reduce the cost of modifying a half-bridge power converter to a full-bridge power converter.

The power converter of the disclosure includes an LLC converter, a feedback circuit, a first driving circuit, and a second driving circuit. The LLC converter includes a first arm transistor group and a second arm transistor group. The feedback circuit provides a feedback signal corresponding to a current value of the LLC converter. The first driving circuit is coupled to the feedback circuit and the first arm transistor group. The first driving circuit drives the first arm transistor group in response to the feedback signal and provides a control signal. The second driving circuit is coupled to the first driving circuit and the second arm transistor group. The second driving circuit drives the second arm transistor group in response to the control signal.

In an embodiment of the disclosure, the LLC converter includes a resonant circuit. The resonant circuit is coupled between a first node of the first arm transistor group and a second node of the second arm transistor group.

In an embodiment of the disclosure, the feedback circuit and the resonant circuit are inductively coupled for generating the feedback signal corresponding to a current value of the resonant circuit and compensating the phase of the feedback signal.

In an embodiment of the disclosure, the feedback circuit includes a first feedback winding, a second feedback winding, a feedback resistor, and a feedback capacitor. The first feedback winding is coupled to the resonant circuit. The second feedback winding is coupled between the first driving circuit and a reference low voltage. The second feedback winding and the first feedback winding are induced for generating a current signal corresponding to the current value of the resonant circuit. The feedback resistor is connected in parallel to the second feedback winding. The feedback resistor converts the current signal into a sensing voltage signal. The feedback capacitor is coupled between the second feedback winding and the reference low voltage. The feedback capacitor compensates the phase of the sensing voltage signal for generating the feedback signal.

In an embodiment of the disclosure, the phase of the feedback signal lags behind the phase of the sensing voltage signal. The phase of the feedback signal is approximately the same as the current phase of the sensing voltage signal.

In an embodiment of the disclosure, the power converter further includes a coupling circuit. The coupling circuit is coupled between the first driving circuit and the second driving circuit. The coupling circuit transmits the control signal from the first driving circuit to the second driving circuit by inductive coupling.

In an embodiment of the disclosure, the first arm transistor group includes a first transistor and a second transistor. The second transistor is connected to the first node with the first transistor, and is serially connected between an input terminal of the LLC converter and the reference low voltage with the first transistor. The second arm transistor group includes a third transistor and a fourth transistor. The fourth transistor is connected to the second node with the third transistor, and is serially connected between the input terminal of the LLC converter and the reference low voltage with the third transistor. The second driving circuit drives the third transistor and the fourth transistor based on the control signal.

In an embodiment of the disclosure, the coupling circuit includes a first loop and a second loop. The first loop is coupled between a control terminal of the first transistor and the first node. The second loop is coupled between the second driving circuit and the reference low voltage. The first loop and the second loop are isolated from each other.

In an embodiment of the disclosure, the first loop includes a first coupling winding and a first capacitor. The first capacitor and the first coupling winding are serially coupled between the control terminal of the first transistor and the first node. The first capacitor compensates the phase of the control signal.

In an embodiment of the disclosure, the second loop includes a second coupling winding, a second capacitor, and a diode. The second coupling winding and the first coupling winding are inductively coupled for receiving the control signal. The second capacitor and the second coupling winding are serially coupled between the second driving circuit and the reference low voltage. The second capacitor compensates the phase of the control signal. A cathode of the diode is coupled to the second driving circuit. An anode of the diode is coupled to the reference low voltage.

Based on the above, the feedback circuit provides the feedback signal corresponding to the LLC converter. The first driving circuit drives the first arm transistor group in response to the feedback signal and provides the control signal. The second driving circuit drives the second arm transistor group in response to the control signal. In other words, the first driving circuit drives the first arm transistor group, and the second driving circuit drives the second arm transistor group in response to the driving of the first driving circuit. Therefore, added with the second arm transistor group, the power converter may drive the LLC converter by cooperative operation of the first driving circuit and the newly-added second driving circuit. In this way, compared with the current technology, the cost of modifying a half-bridge LLC converter to a full-bridge LLC converter may be reduced.

In order to make the aforementioned features and advantages of the disclosure comprehensible, embodiments accompanied with drawings are described in detail below.

DESCRIPTION OF THE EMBODIMENTS

Figure 1:
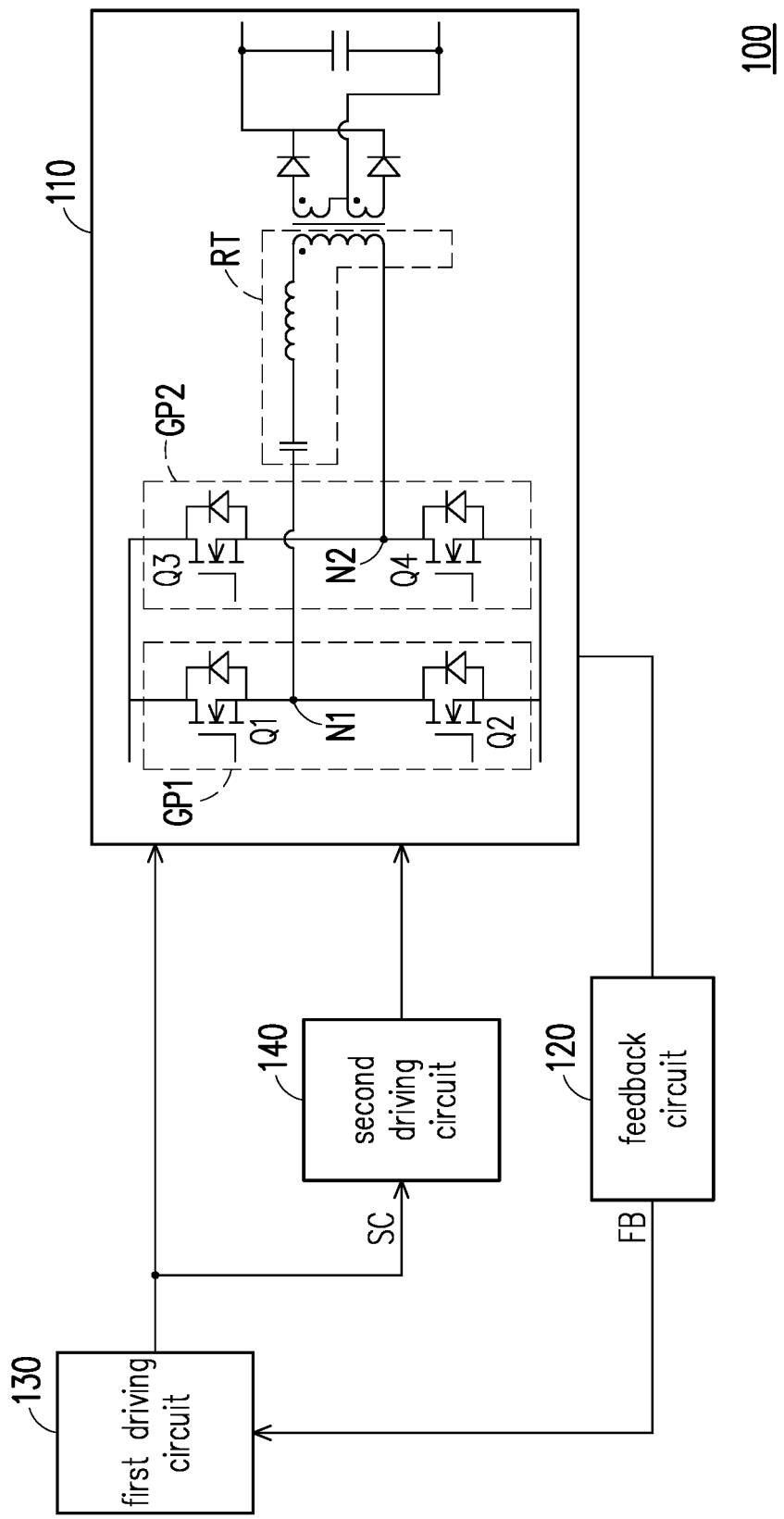
FIG. 1 is a schematic diagram of a power converter according to the first embodiment of the disclosure.

Part of the embodiments of the disclosure will be described in detail below with accompanying drawings. For the reference numerals used in the following description, the same reference numerals appearing in different drawings will be regarded as the same or similar elements. These embodiments are only a part of the disclosure and do not disclose all possible implementations of the disclosure. More precisely, these embodiments only serve as examples within the scope of the claims of the disclosure.

Please refer to FIG. 1. FIG. 1 is a schematic diagram of a power converter according to the first embodiment of the disclosure. In this embodiment, a power converter 100 includes an LLC converter 110, a feedback circuit 120, a first driving circuit 130, and a second driving circuit 140. The LLC converter 110 includes a first arm transistor group GP1 and a second arm transistor group GP2. The feedback circuit 120 provides a feedback signal FB corresponding to the current value of the LLC converter. For example, the first arm transistor group GP1 includes transistors Q1 and Q2. The transistor Q1 and the transistor Q2 are connected to a first node N1. The transistors Q1 and Q2 are serially connected between an input terminal of the LLC converter and a reference low voltage (for example, a ground terminal). The second arm transistor group GP2 includes transistors Q3 and Q4. The transistors Q3 and Q4 are connected to a second node N2. The transistors Q3 and Q4 are serially connected between the input terminal of the LLC converter and the reference low voltage. The LLC converter 110 further includes a resonant circuit RT. The resonant circuit RT is disposed between the first node N1 and the second node N2. The feedback circuit 120 senses the current value at the resonant circuit RT and provides the feedback signal FB corresponding to the current value according to the current value at the resonant circuit RT. In some embodiments, the resonant circuit RT may be serially coupled between the first node N1 and the second node N2 with a primary side coil of the LLC converter 110. In some embodiments, the resonant circuit RT is coupled between the first node N1 and the second node N2, and an inductor in the resonant circuit RT is coupled in parallel with the primary side coil of the LLC converter 110. The disclosure is not limited to the configuration of the resonant circuit RT and the primary side coil.

In this embodiment, the first driving circuit 130 is coupled to the feedback circuit 120 and the first arm transistor group GP1. The first driving circuit 130 receives the feedback signal FB and drives the first arm transistor group GP1 in response to the feedback signal FB. In other words, the first driving circuit 130 drives the first arm transistor group GP1 in response to the operation of the LLC converter. In addition, the first driving circuit 130 further provides a control signal SC. In this embodiment, the control signal SC is associated with the state of the first driving circuit 130 driving the first arm transistor group GP1. In this embodiment, the first driving circuit 130 is realized by, for example, one single half-bridge controller. For example, the first driving circuit 130 may be a half-bridge controller such as NCP13992, L6599, or the like.

In addition, the power converter 100 may use the first driving circuit 130 and the feedback circuit 120 to form a closed loop driving architecture, thereby stabilizing the operation of the first driving circuit 130.

In this embodiment, the second driving circuit 140 is coupled to the first driving circuit 130 and the second arm transistor group GP2. The second driving circuit 140 receives the control signal SC from the first driving circuit 130. The second driving circuit 140 drives the second arm transistor group GP2 in response to the control signal SC. The second driving circuit 140 is realized by, for example, one single half-bridge driver. For example, the second driving circuit 140 may be a half-bridge driver such as NCP5106A, NCP5304, or the like.

In this embodiment, the second driving circuit 140 drives the second arm transistor group GP2 in response to the control signal SC of the first driving circuit 130. Therefore, added with the second arm transistor group, the power converter 100 may drive the LLC converter by cooperative operation of the first driving circuit and the newly-added second driving circuit 140. When modifying the half-bridge architecture of the LLC converter 110 to a full-bridge architecture, this embodiment only needs to add the feedback circuit 120 and the second driving circuit 140, without replacing the first driving circuit 130 with a micro-controller unit. In this way, compared with the current technology, the cost of modifying a half-bridge LLC converter to a full-bridge LLC converter may be reduced.

In this embodiment, a secondary side circuit of the LLC converter may be a non-synchronous rectification circuit. In some embodiments, the secondary side circuit of the LLC converter may be a synchronous rectification circuit. The disclosure is not limited to the secondary side circuit architecture of the LLC converter 110.

Figure 2:
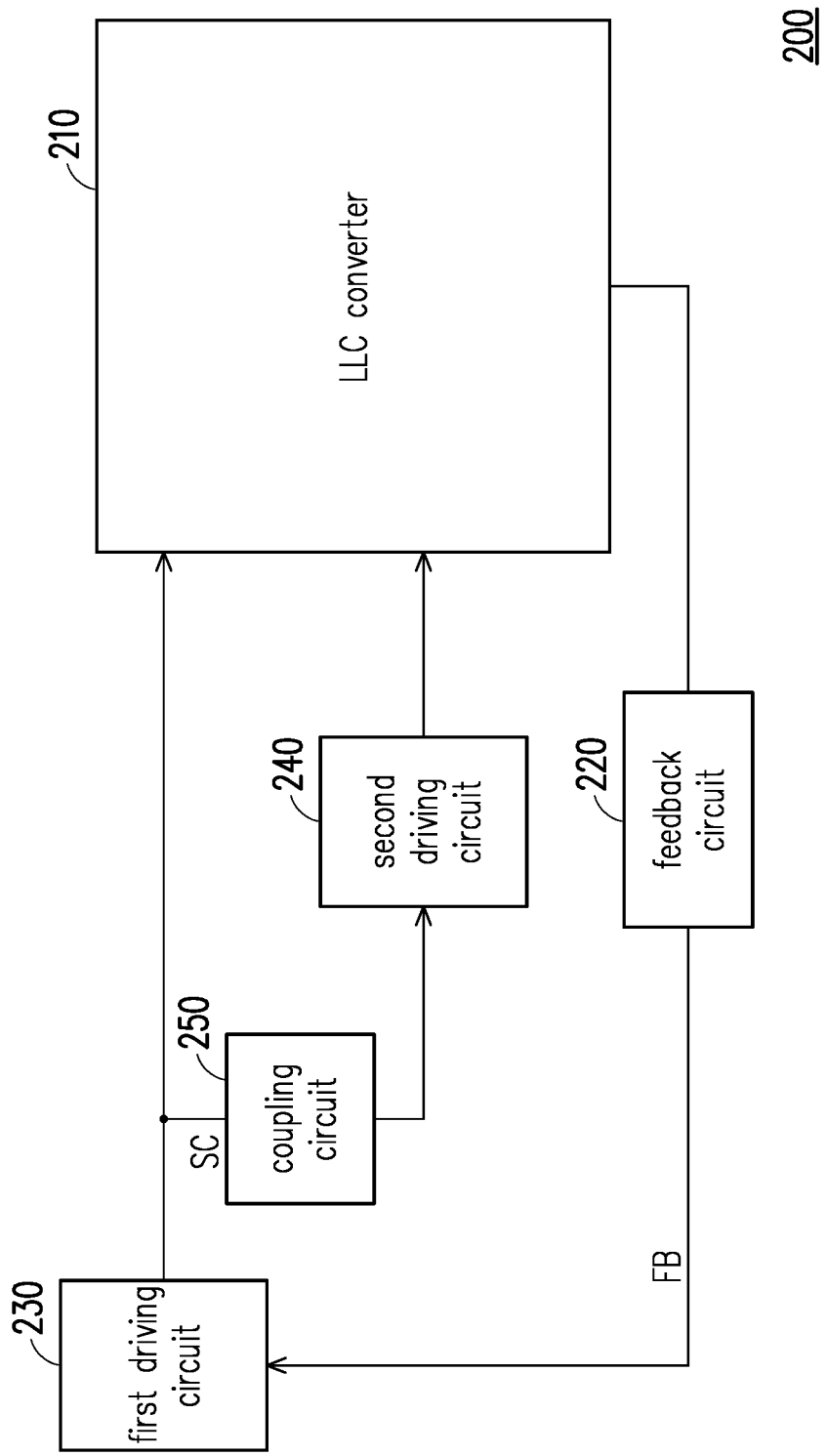
FIG. 2 is a schematic diagram of a power converter according to the second embodiment of the disclosure.

Please refer to FIG. 2. FIG. 2 is a schematic diagram of a power converter according to the second embodiment of the disclosure. In this embodiment, a power converter 200 includes an LLC converter 210, a feedback circuit 220, a first driving circuit 230, a second driving circuit 240, and a coupling circuit 250. The cooperative operation between the LLC converter 210, the feedback circuit 220, and the first driving circuit 230 may be sufficiently taught in the first embodiment of FIG. 1, and thus details thereof are not described herein. The coupling circuit 250 is coupled between the first driving circuit 230 and the second driving circuit 240. The coupling circuit 250 transmits the control signal SC from the first driving circuit 230 to the second driving circuit 240 by inductive coupling.

Figure 3:
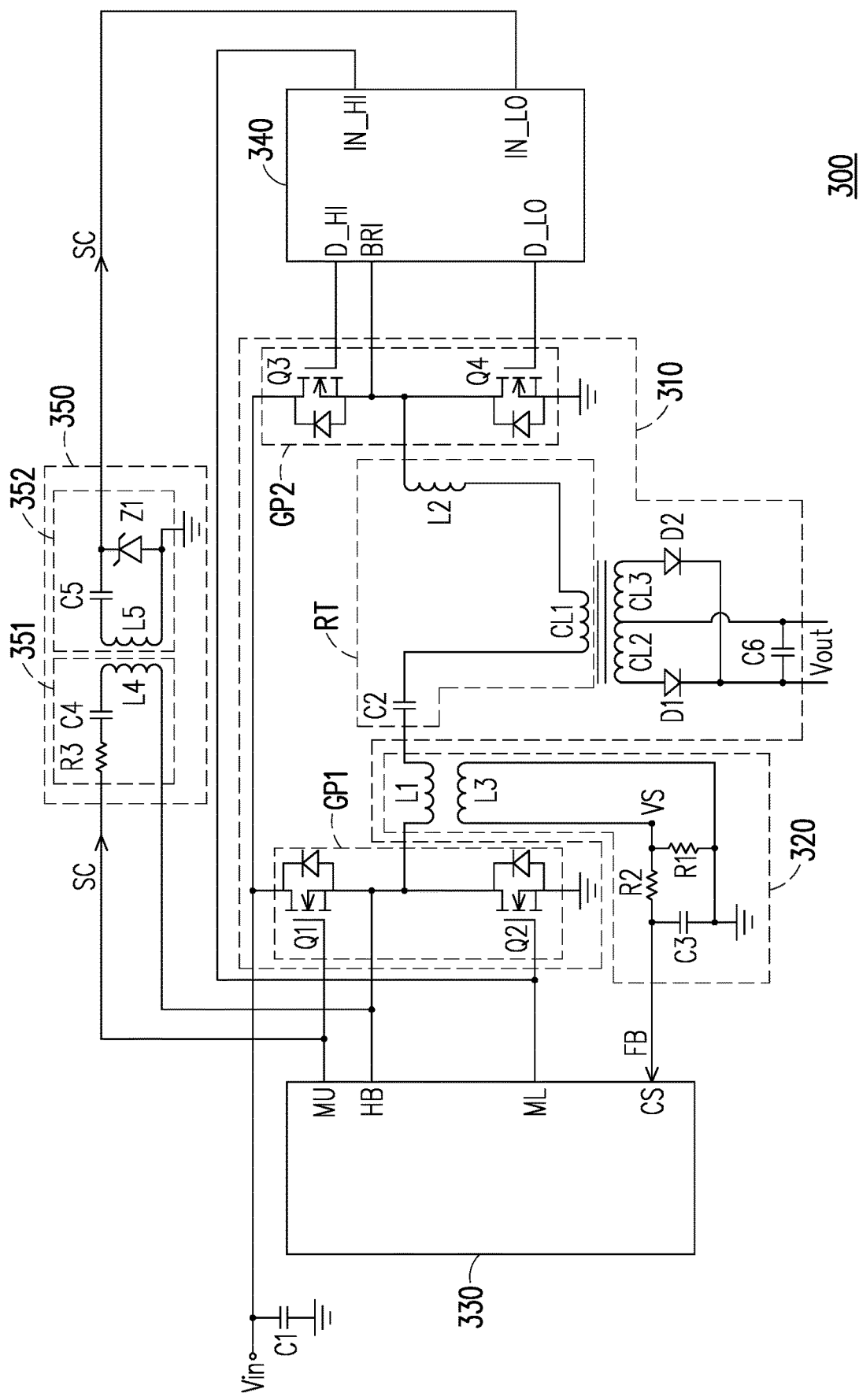
FIG. 3 is a schematic diagram of a power converter according to the third embodiment of the disclosure.

For further explanation, please refer to FIG. 3. FIG. 3 is a schematic diagram of a power converter according to the third embodiment of the disclosure. In this embodiment, a power converter 300 includes an LLC converter 310, a feedback circuit 320, a first driving circuit 330, a second driving circuit 340, and a coupling circuit 350. The LLC converter 310 includes the first arm transistor group GP1, the second arm transistor group GP2, the resonant circuit RT, and the secondary side circuit. The first arm transistor group GP1 and the second arm transistor group GP2 are respectively connected in parallel with an input capacitor C1. The first arm transistor group GP1 includes the transistors Q1 and Q2. The transistor Q1 and the transistor Q2 are connected to the first node N1. The transistors Q1 and Q2 are serially connected between the input terminal of the LLC converter and the reference low voltage. The input terminal of the LLC converter 310 is used to receive an input voltage Vin. The second arm transistor group GP2 includes the transistors Q3 and Q4. The transistors Q3 and Q4 are connected to the second node N2. The transistors Q3 and Q4 are serially connected between the input terminal of the LLC converter and the reference low voltage. The resonant circuit RT is coupled between the first node N1 and the second node N2.

Taking this embodiment as an example, the resonant circuit RT is coupled between the first node N1 and the second node N2. The feedback circuit 320 includes a first feedback winding L1, a second feedback winding L3, a feedback resistor R1, and a feedback capacitor C3. The first feedback winding L1 and the resonant circuit RT are serially coupled between the first node N1 and the second node N2. The resonant circuit RT includes an inductor L2, a primary side coil CL1, and a capacitor C2. The first feedback winding L1, the inductor L2, the capacitor C2, and the primary side coil CL1 are serially coupled. In some embodiments, the series sequence of the first feedback winding L1, the inductor L2, the capacitor C2, and the primary side coil CL1 may be changed according to actual requirements. In some embodiments, the inductor L2 may be designed to be connected in parallel with the primary side coil CL1. The disclosure is not limited to the coupling method of the resonant circuit RT and the primary side coil CL1 in this embodiment.

In this embodiment, the first driving circuit 330 includes at least pins MU, HB, ML, and CS. The pin MU is coupled to the control terminal of the transistor Q1. The first driving circuit 330 drives the transistor Q1 through the pin MU. The pin ML is coupled to the control terminal of the transistor Q2. The first driving circuit 330 drives the transistor Q2 through the pin ML. The pin HB is coupled to the first node N1. The first driving circuit 330 receives the feedback signal FB through the pin CS. In this embodiment, the feedback circuit 320 and the resonant circuit RT are inductively coupled for generating the feedback signal FB corresponding to the current value of the resonant circuit RT. In addition, the feedback circuit 320 further compensates the phase of the feedback signal FB.

In this embodiment, a feedback capacitor C3 is coupled between the first driving circuit 330 (i.e., the pin CS) and the reference low voltage. The second feedback winding L3 and the first feedback winding L1 are induced for generating the current signal corresponding to the current value of the resonant circuit RT. Taking this embodiment as an example, the second feedback winding L3 is inductively coupled with the first feedback winding L1. In other words, the second feedback winding L3 generates the current signal corresponding to the value of the current flowing through the first feedback winding L1. The feedback resistor R1 is connected in parallel with the second feedback winding L3. The feedback resistor R1 converts the current signal into a sensing voltage signal VS. The feedback capacitor C3 is coupled between the first driving circuit 330 (i.e., the pin CS) and the reference low voltage. The feedback capacitor C3 compensates the phase of the sensing voltage signal VS for generating the feedback signal FB. In this embodiment, based on inductive coupling, the phase of the sensing voltage signal VS is approximately the same as the current phase of the resonant circuit RT. It should be noted that the phase of the sensing voltage signal VS causes the first driving circuit 330 mainly in the half-bridge driving mode to form misoperation. Therefore, the feedback capacitor C3 compensates the phase of the sensing voltage signal VS for generating the feedback signal FB, such that the phase of the feedback signal FB lags behind the current phase of the resonant circuit RT, and the operation of the first driving circuit 330 may be normal. In this embodiment, the first feedback winding L1 and the second feedback winding L3 may be part of a current transformer (CT).

In this embodiment, the feedback circuit 320 may further include a resistor R2. The resistor R2 is coupled between the first terminal of the feedback resistor R1 and the first terminal of the feedback capacitor C3. The second terminal of the feedback resistor R1 and the second terminal of the feedback capacitor C3 are coupled to the reference low voltage. Therefore, the feedback resistor R1, the resistor R2, and the feedback capacitor C3 form a resistor-capacitor network together. In some embodiments, the resistor-capacitor network is not limited to having only the feedback resistor R1, the resistor R2, and the feedback capacitor C3.

In this embodiment, the second driving circuit 340 at least includes pins IN_HI, D_HI, IN_LO, D_LO, and BRI. The pin IN_HI is coupled to the pin ML. The pin D_HI is coupled to the control terminal of the transistor Q3. Based on the signal received by the pin IN_HI, the second driving circuit 340 drives the transistor Q3 through the pin D_HI. Therefore, the transistors Q2 and Q3 are generally turned on or turned off at the same time. The second driving circuit 340 receives the control signal SC through the pin IN_LO. The pin D_LO is coupled to the control terminal of the transistor Q4. Based on the control signal SC, the second driving circuit 340 drives the first arm transistor group GP1 (i.e., the transistors Q3 and Q4) through the pin D_LO. In addition, the pin BRI is coupled to the second node N2.

In this embodiment, the coupling circuit 350 includes a first loop 351 and a second loop 352. The first loop 351 is coupled between the control terminal of the transistor Q1 and the first node N1. The second loop 352 is coupled between the second driving circuit 340 and the reference low voltage. Furthermore, the first loop 351 may be regarded as being coupled between the pin MU and the pin HB. The second loop 352 may be regarded as being coupled between the pin IN_LO and the reference low voltage. It should be noted that the first loop 351 and the second loop 352 are isolated from each other. The reference point (or common point) of the first driving circuit 330 may be different from the reference point of the second driving circuit 340. The isolation between the first circuit 351 and the second circuit 352 may avoid the second driving circuit 340 from causing anomaly or misoperation. In this embodiment, the coupling circuit 350 helps the LLC converter 310 to achieve zero voltage switching (ZVS) under a full-bridge architecture.

In this embodiment, the first loop 351 includes a first coupling winding L4 and a capacitor C4. The capacitor C4 and the first coupling winding L4 are serially coupled between the control terminal of the transistor Q1 and the first node N1. The capacitor C4 compensates the phase of the control signal SC. In light of this, the control signal SC is associated with the signal used to drive the transistor Q1.

In this embodiment, the first loop 351 further includes a resistor R3. The resistor R3, the capacitor C4, and the first coupling winding L4 are serially coupled between the control terminal of the transistor Q1 and the first node N1. The series sequence of the resistor R3, the capacitor C4, and the first coupling winding L4 may be changed according to actual requirements. The disclosure is not limited to the series sequence of the first loop 351 of this embodiment.

In this embodiment, the second circuit 352 includes a second coupling winding L5, a capacitor C5, and a diode Z1. The second coupling winding L5 and the first coupling winding L4 are inductively coupled for receiving the control signal SC. The capacitor C5 and the second coupling winding L5 are serially coupled between the second driving circuit 340 and the reference low voltage. The capacitor C5 compensates the phase of the control signal SC. The cathode of the diode Z1 is coupled to the second driving circuit 340 (i.e., the pin IN_LO). The anode of the diode Z1 is coupled to the reference low voltage. In this embodiment, the diode Z1 are used to limit the voltage value of the control signal SC. In this embodiment, the diode Z1 may be realized by a Zener diode. In this embodiment, the first coupling winding L4 and the second coupling winding L5 may be part of a potential transformer (PT).

In this embodiment, the secondary side circuit is used to provide an output voltage Vout. Taking this embodiment as an example, the secondary side circuit includes secondary side coils CL2 and CL3, diodes D1 and D2, and an output capacitor C6. The first terminal of the secondary side coil CL2 is connected to the first terminal of the secondary side coil CL3. The second terminal of the secondary side coil CL2 is coupled to the anode of the diode D1. The second terminal of the secondary side coil CL3 is coupled to the anode of the diode D2. The cathode of the diode D1 is coupled to the cathode of the diode D2. In addition, the output capacitor C6 is coupled between the first terminal of the secondary side coil CL2 and the cathode of the diode D1.

In summary, the power converter includes the LLC converter, the feedback circuit, the first driving circuit, and the second driving circuit. The feedback circuit provides the feedback signal corresponding to the LLC converter. The first driving circuit drives the first arm transistor group in response to the feedback signal and provides the control signal. The second driving circuit drives the second arm transistor group in response to the control signal. Therefore, added with the second arm transistor group, the power converter may drive the LLC converter by cooperative operation of the first driving circuit and the newly-added second driving circuit. In this way, compared with the current technology, the cost of modifying a half-bridge LLC converter to a full-bridge LLC converter may be reduced. In addition, in some embodiments, the power converter further includes the coupling circuit. The coupling circuit includes the first loop and the second loop. The first loop is coupled between the control terminal of the first transistor and the first node. The second loop is coupled between the second driving circuit and the reference low voltage. The first loop and the second loop are isolated from each other, thereby avoiding the second driving circuit from causing anomaly or misoperation.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A power converter, comprising:
   an LLC converter, comprising a first arm transistor group and a second arm transistor group;
   a feedback circuit, configured to provide a feedback signal corresponding to a current value of the LLC converter;
   a first driving circuit, coupled to the feedback circuit and the first arm transistor group, and configured to drive the first arm transistor group and provide a control signal in response to the feedback signal; and
   a second driving circuit, coupled to the first driving circuit and the second arm transistor group, and configured to drive the second arm transistor group in response to the control signal.

2. The power converter according to claim 1, wherein the LLC converter comprises:
   a resonant circuit, coupled between a first node of the first arm transistor group and a second node of the second arm transistor group.

3. The power converter according to claim 2, wherein the feedback circuit and the resonant circuit are inductively coupled for generating the feedback signal corresponding to a current value of the resonant circuit and compensating a phase of the feedback signal.

4. The power converter according to claim 2, wherein the feedback circuit comprises:
   a first feedback winding, coupled to the resonant circuit;
   a second feedback winding, coupled between the first driving circuit and a reference low voltage, and induced with the first feedback winding for generating a current signal corresponding to a current value of the resonant circuit;
   a feedback resistor, connected in parallel to the second feedback winding, and converting the current signal into a sensing voltage signal; and
   a feedback capacitor, coupled between the second feedback winding and the reference low voltage, and compensating a phase of the sensing voltage signal for generating the feedback signal.

5. The power converter according to claim 4, wherein:
   the phase of the feedback signal is approximately the same as the phase of the sensing voltage signal, and
   the phase of the feedback signal lags behind a current phase of the resonant circuit.

6. The power converter according to claim 2, further comprising:
   a coupling circuit, coupled between the first driving circuit and the second driving circuit, and configured to transmit the control signal from the first driving circuit to the second driving circuit by inductive coupling.

7. The power converter according to claim 6, wherein:
   the first arm transistor group comprises:
   a first transistor; and
   a second transistor, connected to the first node with the first transistor, and serially connected between an input terminal of the LLC converter and a reference low voltage with the first transistor, and
   the second arm transistor group comprises:
   a third transistor; and
   a fourth transistor, connected to the second node with the third transistor, and serially connected between the input terminal of the LLC converter and the reference low voltage with the third transistor,
   the second driving circuit drives the third transistor and the fourth transistor based on the control signal.

8. The power converter according to claim 7, wherein the coupling circuit comprises:
- a first loop, coupled between a control terminal of the first transistor and the first node; and
- a second loop, coupled between the second driving circuit and the reference low voltage,
- wherein the first loop and the second loop are isolated from each other.

9. The power converter according to claim 8, wherein the first loop comprises:
- a first coupling winding; and
- a first capacitor, serially coupled between the control terminal of the first transistor and the first node with the first coupling winding, and configured to compensate a phase of the control signal.

10. The power converter according to claim 9, wherein the second loop comprises:
- a second coupling winding, inductively coupled with the first coupling winding for receiving the control signal;
- a second capacitor, serially coupled between the second driving circuit and the reference low voltage with the second coupling winding, and configured to compensate the phase of the control signal; and
- a diode, wherein a cathode of the diode is coupled to the second driving circuit, and an anode of the diode is coupled to the reference low voltage.

* * * * *